United States Patent [19]
Logie

[11] 3,876,110
[45] Apr. 8, 1975

[54] VENDING MACHINE FOR FRESHLY SERVED ICE CREAM OR SHERBERT CUPS OR CONES

[76] Inventor: Roland H. Logie, 14200 S.E. 165th Pl., Renton, Wash. 98055

[22] Filed: May 14, 1971

[21] Appl. No.: 143,501

[52] U.S. Cl. ............ 222/80; 222/52; 222/63; 222/146 C; 222/334; 222/386.5; 425/109; 425/118; 425/126; 53/123
[51] Int. Cl. ........ B67b 7/38; B67d 5/62; F25c 7/18
[58] Field of Search ............ 222/146 C, 334, 386.5, 222/504, 80, 389, 342, 334, 63, 52; 53/123; 425/114, 118, 109, 126, 221, 276; 99/137

[56] References Cited
UNITED STATES PATENTS

| | | | |
|---|---|---|---|
| 2,524,673 | 10/1950 | Martin | 222/146 C X |
| 2,558,887 | 7/1951 | Tesiero | 222/146 C X |
| 2,571,283 | 10/1951 | Nicholson | 221/11 X |
| 2,579,096 | 12/1951 | Schulz | 53/123 X |
| 2,624,499 | 1/1953 | Gold | 53/123 X |
| 3,185,098 | 5/1965 | Lundh | 222/334 X |
| 3,319,837 | 5/1967 | Mueller | 222/386.5 X |
| 3,478,702 | 11/1969 | Simonich | 425/118 |

*Primary Examiner*—Robert B. Reeves
*Assistant Examiner*—Joseph J. Rolla

[57] ABSTRACT

This disclosure describes the construction and operation of an automatic machine for dispensing ice cream cones of genuine hard ice cream or sherbert freshly served from bulk storage in tanks within the machine. Initiation of the automatic cycle is optionally coin or attendant controlled and a desired flavor of ice cream is obtained by pushing a selector button. This actuates synchronized automatic systems which dispense a cup-cone, extrude a serving of ice cream from the bottom of the selected tank, cut off the serving with twin piano wire loops and translate the serving from under the tank to the waiting cup-cone in one of the two ice cream cone delivery alcoves at the center of the front face of the machine.

7 Claims, 21 Drawing Figures

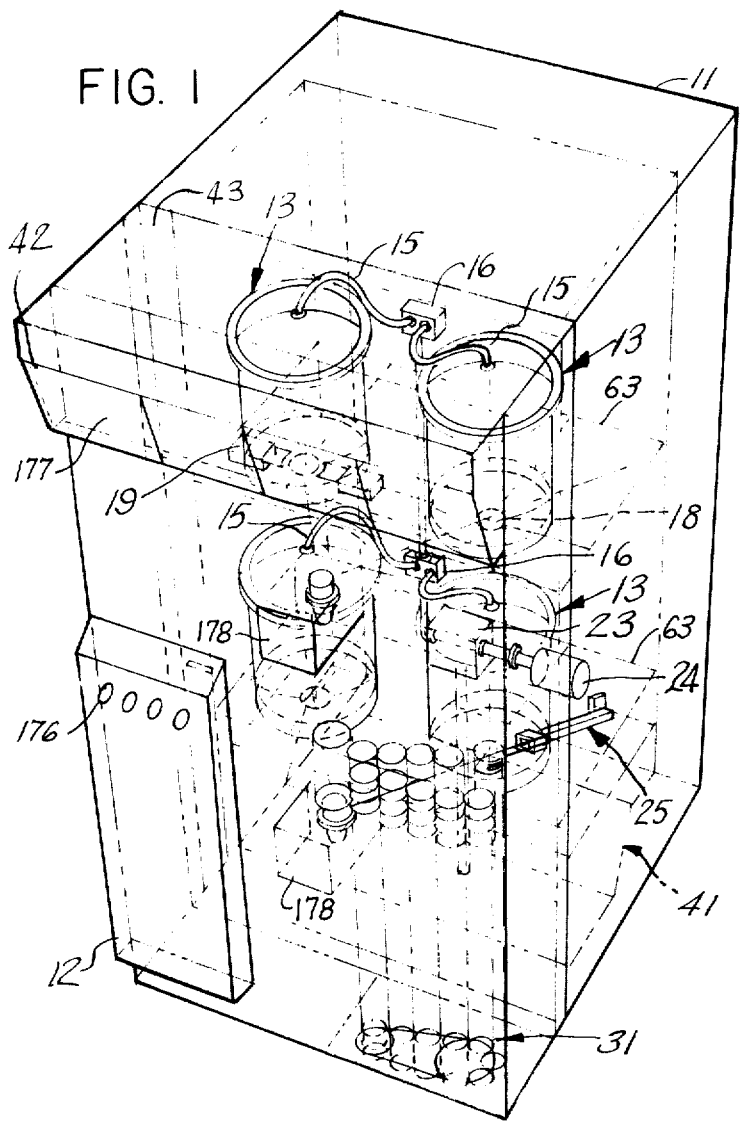
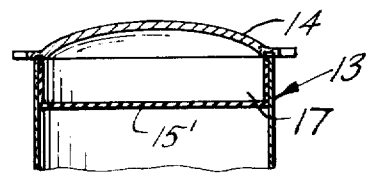
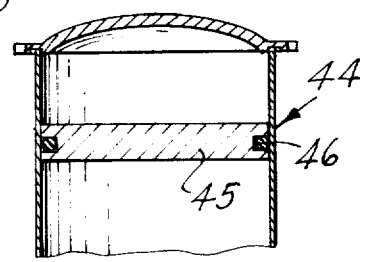
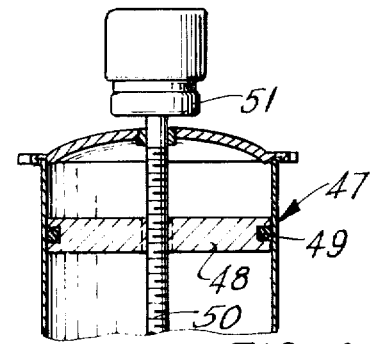
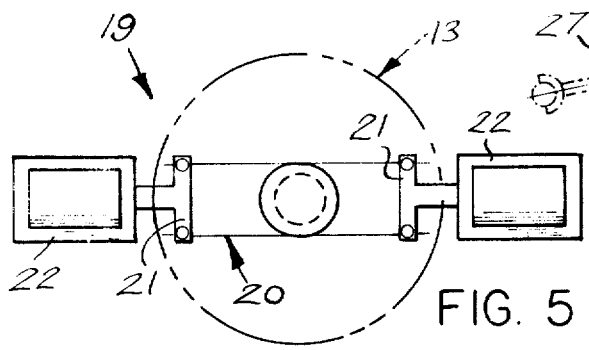
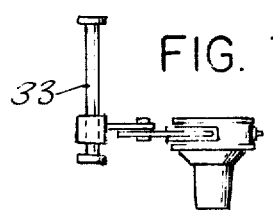
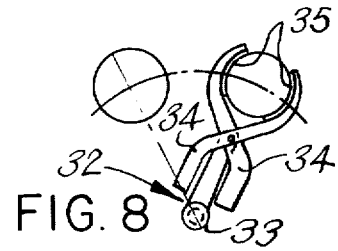

INVENTOR
ROLAND H. LOGIE

INVENTOR
ROLAND H. LOGIE

INVENTOR
ROLAND H. LOGIE

VENDING MACHINE FOR FRESHLY SERVED ICE CREAM OR SHERBERT CUPS OR CONES

This invention relates to ice cream dispensing apparatus and more particularly to an automatic vending machine for freshly served ice cream or sherbert cups or cones.

Existing means of dispensing genuine hard ice cream or the like consist of hand scooping fresh individual servings from bulk containers, vending bulk packages of ice cream from coin operated storage freezers, vending pre-packaged and wrapped individual ice cream bars and cones in coin operated machines and clerk or self serving of packaged ice cream from freezers in stores and supermarkets.

This invention is novel in providing means for automatically dispensing freshly served ice cream cones or the like from bulk storage in the machine. It provides for fresh, fast, sanitary, economical serving of exactly uniform amounts of ice cream or the like in each cup-cone.

The principal object of this invention is to provide a fast, sanitary means of automatically dispensing fresh individual servings of ice cream or sherbert from bulk storage in a coin operated or attendant operated vending machine.

It is a further object of this invention to include a hydraulic system in the machine consisting of: a hydraulic fluid reservoir containing antifreeze, food compatible propylene glycol; a gear motor operated pump; hydraulic lines; hydraulic selector valves; rubber diaphragms between the tank lids and the bulk ice cream; fluid return motor and pump and the required switches and wiring to electrically operate the system. The purpose of this system is to provide a pressure means of extruding fresh individual servings of genuine hard ice cream from bulk storage in the tanks.

Another object of the invention is to provide, in an apparatus of the type described, a lighted, colored picture display of the different flavored ice cream cones available for selection in the machine; lighted and labeled selector buttons with sold out lights; a coin operated starter mechanism and coin changer; a coin return slot and alcove; a coin collection box; switches, operated by the flavor selection buttons, to actuate the proper selector valve to direct the hydraulic pressure to the tank containing the selected flavor; and two ice cream cone delivery alcoves each covered by a plexiglass door. One delivery alcove is not too high for small children to reach and the other is somewhat higher for other people.

An important further object of the invention is to provide, in a machine of the type described, twin loop solenoid operated serving cut-off mechanisms which pull two piano wire loops through the extruded ice cream in opposite directions to separate a precise quantity of ice cream for an individual serving.

Another object of the invention is to provide serving translator mechanisms for the described machine which will pick up the separated servings of ice cream or the like in forks and translate them from under the tanks diagonally through an opening in the freezer door to place them in waiting cake cup-cones in the serving delivery alcoves at the center of the front face of the machine.

Working in conjunction with the twin piano wire loop serving cut-off mechanisms noted above, another object of the invention is to provide stainless steel serving register plates mounted on parallelogram type levers which hold them flush against the flange on an extrusion sleeve communicating with the circular extrusion holes in the bottoms of the bulk ice cream tanks. As the ice cream serving is extruded it pushes said register plate down. This in turn moves said parallelogram lever down against three switch buttons. Two of the three switches energize the twin cut-off piano wire loop solenoids pulling the two said loops through the extruded ice cream in opposite directions to cut off an individual serving. The third of said switches de-energizes the hydraulic selector valve solenoid which diverts the hydraulic flow from the ice cream tank back to the reservoir, thus stopping the extrusion cycle. The register plate returns to the flush position under the sleeve after the serving has been removed by the serving fork and the fork has returned.

Another object of the invention is to provide cup dispensing mechanisms which will deliver cake cup-cones to the delivery alcoves in time to receive each serving of ice cream or the like delivered by the serving translator forks.

In the present design of a machine to implement this invention, I prefer an arrangement with four bulk ice cream storage tanks. Two tanks are on an upper wire grid shelf and two are on a lower wire grid shelf. The servings from the two upper shelf tanks are delivered to the previously described upper serving delivery alcove. The servings from the lower shelf tanks are delivered to the lower serving alcove. One gear motor operated hydraulic pressure pump and a reservoir serves all four ice cream tanks. There is a flavor selection button, a hydraulic selector valve, a serving register plate and lever system, a cut-off mechanism, a serving translator mechanism, and a cup dispensing mechanism for each of the four ice cream storage tanks. Each full ice cream tank contains many gallons of ice cream or the like for numerous individual servings and the cup-cone dispenser for each tank has enough cup-cones per loading for all the ice cream servings in the tank.

Other objects of the present invention are to provide a vending machine for freshly served ice cream or sherbert cups or cones which is simple in design, inexpensive to manufacture, rugged in construction, easy to use and efficient in operation.

These and other objects will become readily evident upon a study of the following specification together with the annexed drawings in which:

FIG. 1 is a perspective phantom view of the present invention;

FIG. 2 is a fragmentary and vertical view of one of the extrusion tanks shown in elevation and in section;

FIG. 3 is similar to FIG. 2, but showing a modified form of extrusion tank utilizing a piston with an O-ring;

FIG. 4 is similar to FIG. 3, but showing a gear motor driven lead screw for advancing the piston contained therein;

FIG. 5 is a diagramatic plan view showing the ice cream cut-off mechanism;

FIG. 6 is a diagramatic view of a serving translator;

FIG. 7 is a side view of the scissors clamp assembly shown removed from FIG. 1;

FIG. 8 is a top plan view of FIG. 7;

FIG. 9 is a plan view of the cone stack lifter mechanism;

Figure 10:
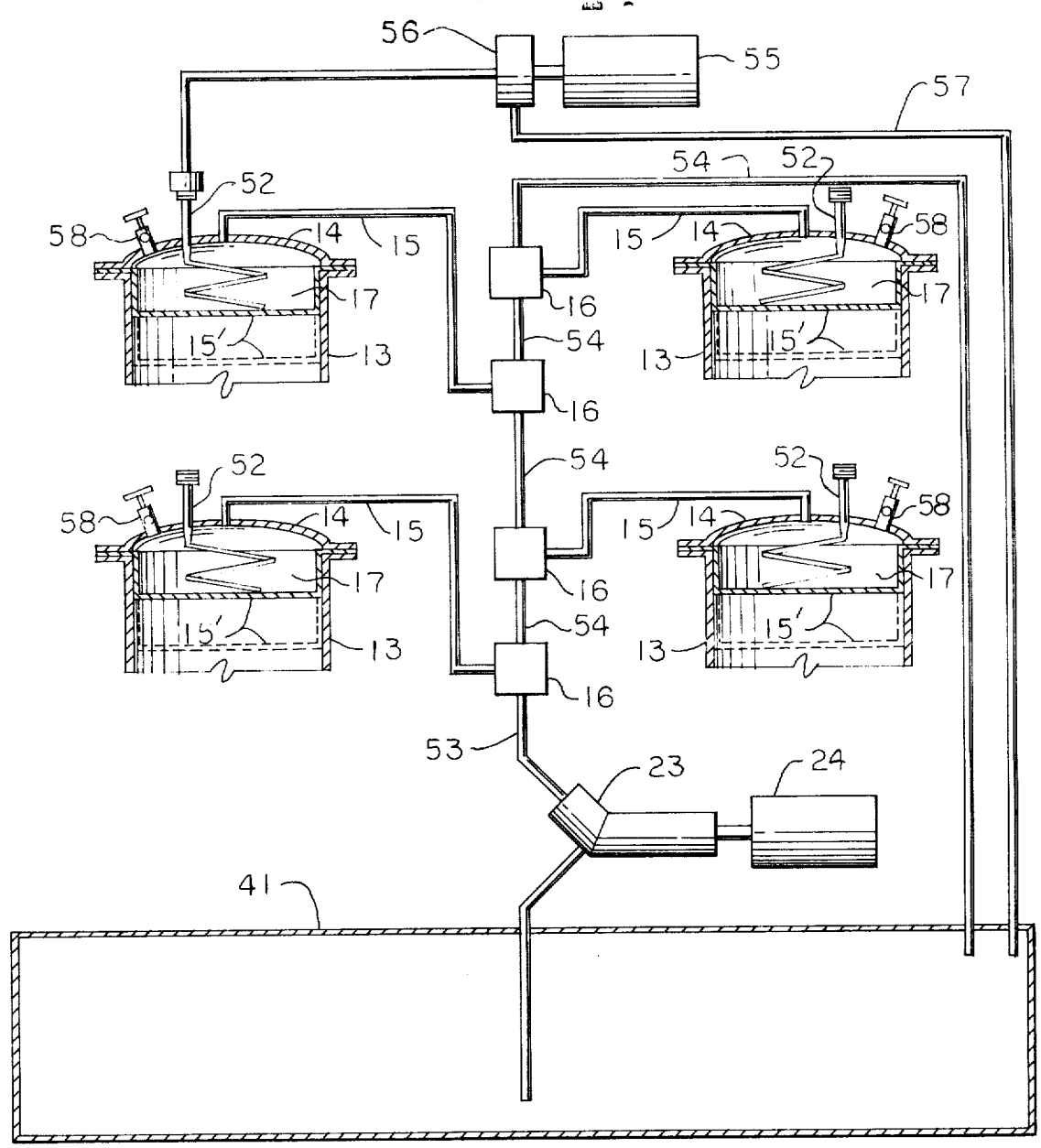
FIG. 10 is a hydraulic flow system diagram.

FIG. 20 A is the bottom half of a schematic wiring diagram for the vending machine of FIG. 1;

FIG. 20 B is the top half of the schematic wiring diagram.

According to this invention, a vending machine 10 for freshly served ice cream or sherbert cups or cones is shown in FIG. 1 to include an automatic frost free deep-freeze housing 11 having a box 12 which includes flavor selection buttons 176 with lighted labels and sold out lights, a coin mechanism and changer, a coin return slot and alcove, a coin collection box, switches operated by the flavor selection buttons to actuate the proper selector valve to direct the hydraulic pressure to the tank containing the selected flavor, a piano hinge along its side to allow the box to swing out for servicing, and a lock to keep it closed. The details of the refrigeration system in housing 11 and the items listed in box 12 are not new but are used in combination with the systems of this invention to make up vending machine 10. Therefore said items are not shown in the drawings.

It will be noted that apparatus 10 is not limited for coin operation, but may also be utilized by shop attendants in establishments where ice cream or the like is served by provision of push button initiation of the cycle.

On the interior of housing 11 is suitably secured on wire grid shelves 63, a plurality of spaced apart extrusion tanks 13 which carry ice cream or the like in bulk. The extrusion tanks 13 include a quick detachable dome shaped head 14. Attached to the head 14 are hydraulic lines 15 which extend from hydraulic selector valves 16. As can be seen in FIG. 2, within each extrusion tank 13 is a diaphragm 15' of rubber or other suitable stretchable material, the diaphragm 15' together with the domed head 14 defining a hydraulic pressure chamber 17 above the bulk ice cream to be dispensed or extruded from tank 13. As can be seen in FIG. 10, within said chamber is a coiled rubber or plastic tube 52 which has one end connected to the hydraulic fluid return port in head 14. The other end of said tube is open and descends with diaphragm 15' to provide means for pumping the hydraulic fluid back to the reservoir when all the ice cream is extruded from tank 13. Referring back to FIG. 1, at the bottom most portion of extrusion tanks 13 are centrally located extrusion exit openings 18 out of which pass the ice cream which conforms to the inner peripheral shape of opening 18.

Referring to FIG. 1 and also FIG. 10, on the interior of apparatus 10 is suitably secured on the bottom wire grid shelf 63, a hydraulic pump 23 of the positive displacement type which is driven by means of electric gear motor 24 in order to provide hydraulic pressure to any one of the desired hydraulic lines 15 of its respective extrusion tank 13. The proper coins in the coin mechanism of box 12, turn on the hydraulic pump gear motor 24 which pumps hydraulic fluid from reservoir 41 through line 53 and through four selector valves 16 in series and back to the reservoir 41 through return lines 54. When a flavor selection button on box 12 is pushed it closes the switch to the solenoid of selector valve 16 which diverts the hydraulic flow from going back to the reservoir 41 and directs it to the tank 13 containing the selected flavor of ice cream. The hydraulic chamber 17 defined by head 14 and diaphragm 15' is full of hydraulic fluid so that any additional fluid pumped in will stretch diaphragm 15' down and extrude an equal volume of ice cream out of the opening 18 in the bottom of tank 13. When a predetermined volume of ice cream has been extruded from opening 18 it will have lowered the serving register plate 69 of FIG. 12 and actuated the off switch 75 to the solenoid of selector valve 16 turning the hydraulic flow back to the reservoir 41. The hydraulic pump motor 24 is turned off when a relay unlatching switch 172 in FIG. 20B is tripped by return of the serving translator fork 29 of FIGS. 6, 18, and 19. When all of the ice cream in a given tank 13 has been extruded, the machine service man turns on the fluid return pump motor 55 of FIG. 10, which is mounted on the top wire grid shelf in housing 11. This drives fluid return pump 56 and draws the fluid in empty tank 13 out through tube 52 and directs it through hose 57 to the reservoir 41. The reservoir 41 contains enough propylene glycol to fill all of tanks 13. Next the service man removes the quick detachable dome head 14 from the empty tank 13, removes the empty tank and replaces it with a full tank of ice cream previously filled at the ice cream factory. He then attaches the dome head 14 to the new tank 13 and turns hydraulic flow into chamber 17 while bleeding out all air in the chamber through a bleed valve 58 in dome head 14. When the chamer 17 is full of hydraulic fluid the new tank 13 is ready for dispensing ice cream.

Referring now to FIG. 3, one will see a modified form of extrusion tank 44 having on its interior, a piston 45 with an O-ring 46 which together with head 14 defines a hydraulic chamber. Fluid pumped into this chamber forces piston 45 downward upon the bulk ice cream carried in tank 44 causing ice cream to be extruded as in tank 13 from a hole in the bottom of the tank.

Referring now to FIG. 4, one will see another modified form of extrusion tank 47 having an internal piston 48 with an O-ring 49. A screw shaft 50 is threadably carried through the center of piston 48 and when rotated by means of gear motor 51, will cause ice cream to be extruded from tank 47.

Figure 11:
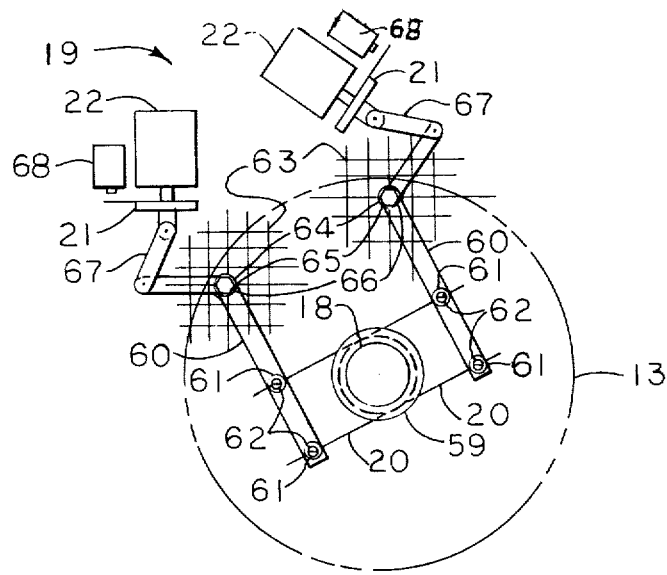
FIG. 11 is a plan view of the actual twin loop solenoid operated serving cut-off mechanism.

Below each extrusion tank 13 centering on extrusion exit opening 18 is a serving cut-off mechanism 19 shown diagramatically in FIGS. 1 and 5 and as a plan view of the actual mechanism in FIG. 11. Each of the serving cut-off mechanisms 19 include twin piano wire loops which overlap each other and encircle the exit opening 18. A stainless steel sleeve and collar 59, on FIG. 11, is centered below exit opening 18, said sleeve serving to convey the extruding ice cream through the wire grid shelf which supports tank 13 and said flat collar serving to define, together with the serving register plate 69 of FIGS. 12 and 13, a plane of operation for piano wire loops 20. Diagramatically, the twin piano wire loops 20 are fixedly secured to a pair of oppositely opposed armatures 21 of solenoids 22. The wire loops 20, when actuated by means of solenoids 22, serve to shear off a predetermined amount of ice cream after it has been extruded from tank 13 and through sleeve and collar 59 to depress register plate 69 a given distance. Each wire loop is pulled half way through the ice cream column in opposite directions thus completely severing a serving which is left resting on register plate 69. In the actual cut-off mechanism shown in FIG. 11, the piano wire loops are attached to levers 60 by passing them through holes in posts 61 and securing them by set screws 62. Levers 60 are attached to the wire grid shelf 63 by pivot bolts 64, nuts 65 and washers 66. Levers 60 are linked to solenoid armatures 21 by links 67. This design allows provision for the required cut-off stroke and room for the solenoids 22 and their off switches 68 among the other mechanisms of the vending machine 10.

Figure 12:
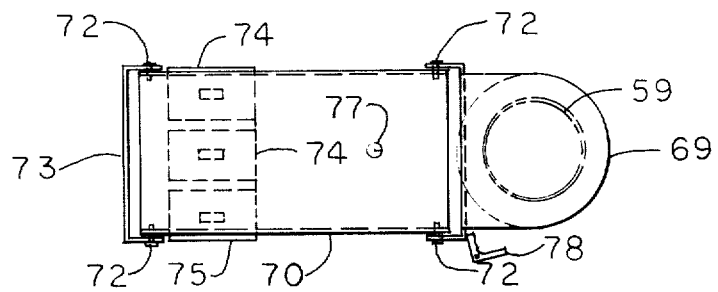
FIG. 12 is a plan view of the stainless steel serving register plate and its parallelogram linkage.
Figure 13:
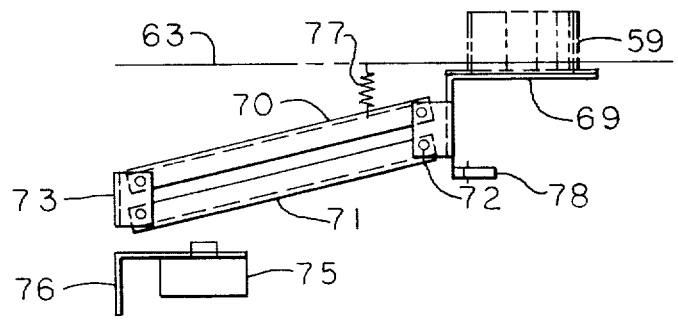
FIG. 13 is an elevation view of the mechanism in FIG. 12.

Refer now to FIGS. 12 and 13. These figures show the serving register plate 69 which is held level and pressed against the collar of sleeve 59 by parallelogram links 70 and 71 secured by pins 72 to wall bracket 73 and to register plate 69. When the ice cream is extruded from hole 18 in the bottom of tank 13 and hence through sleeve 59 it pushes down on register plate 69. As register plate 69 is lowered, it swings links 70 and 71 down pressing link 71 against switches 74 and 75 mounted below link 71 on bracket 76. Two switches 74 turn on the cut-off solenoids. The other switch 75 de-energizes the hydraulic selector valve solenoid 16 which diverts the hydraulic flow from the ice cream tank 13 back to the reservoir 41, thus stopping the extrusion cycle. At the end of its stroke one of the cut-off solenoids throws the on switch for the serving translator gear motor. After the serving translator fork, to be described later, has removed the cut off serving from its resting place on the register plate 69, delivered it to the waiting cup-cone in the delivery alcove 178 (FIGS. 1, 18 and 19), and returned back past the register plate 69, a spring 77 held by torsion spring loaded latch 78 engaged over the top shoulder of the plate 69 bracket is released when latch 78 is tripped by returning fork end 80, to press register plate 69 against sleeve and collar 59 ready for the next serving.

Figure 18:
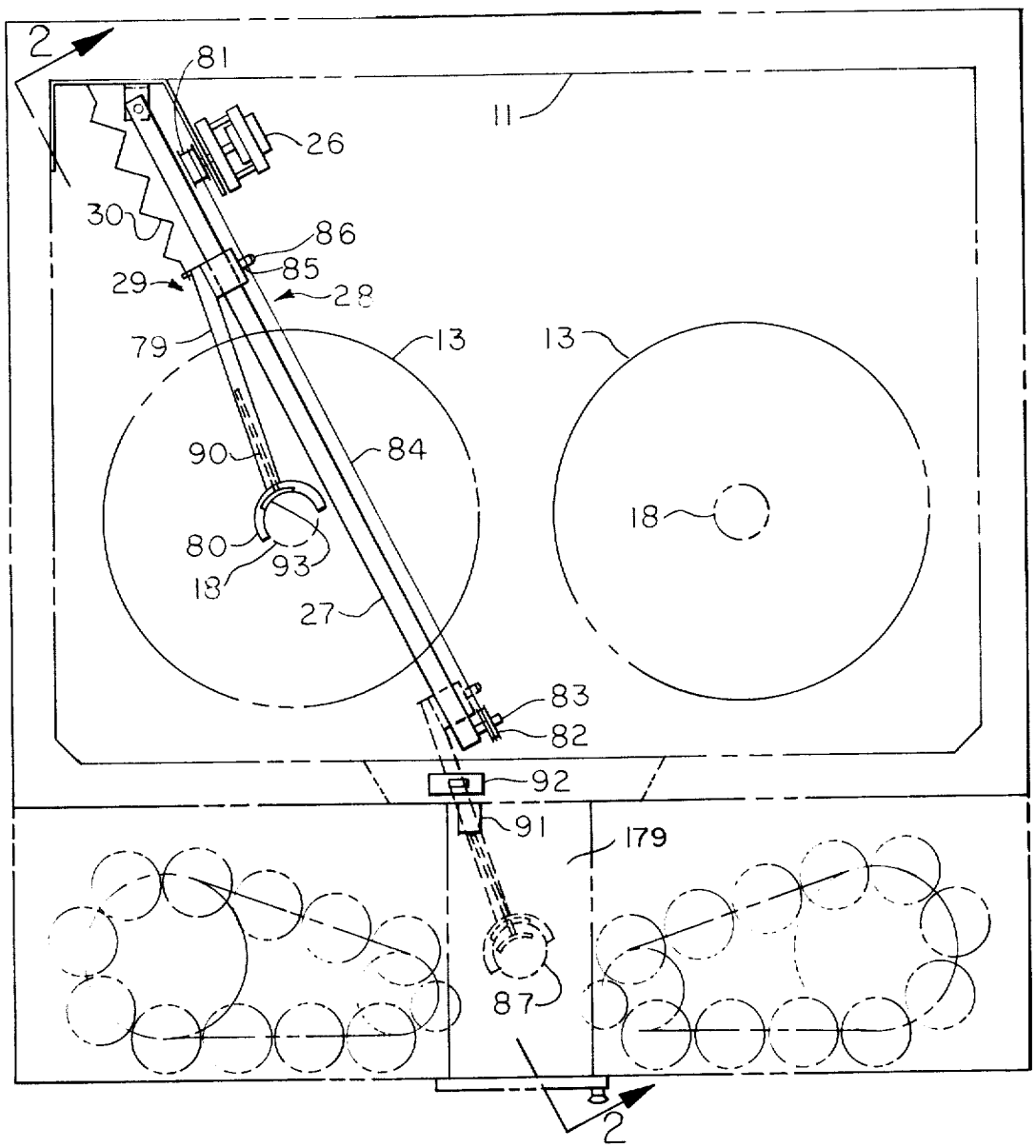
FIG. 18 is a plan view of the actual serving translator mechanism.
Figure 19:
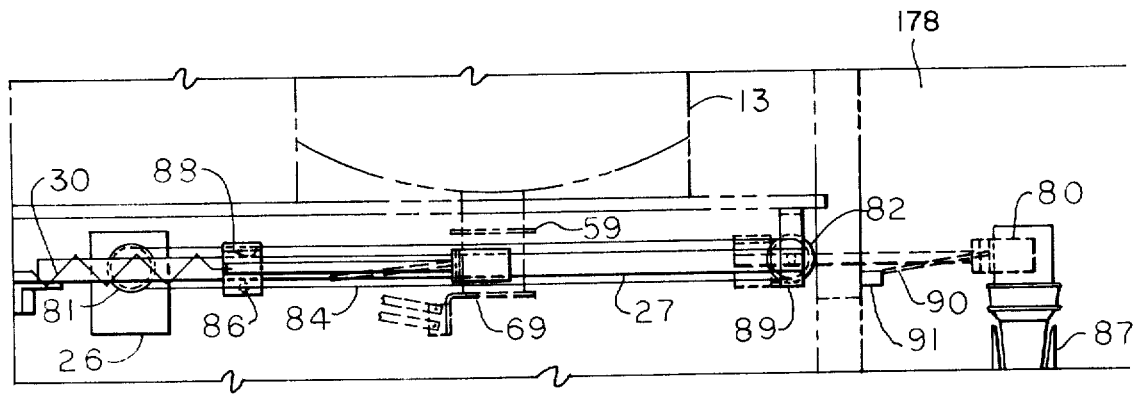
FIG. 19 is a sectional elevation view of the serving translator mechanism taken at section 2—2 in FIG. 18.

Looking at FIG. 6 one will see a diagramatic view of a serving translator, one of which is provided for each tank 13. In FIGS. 18 and 19 one will see a plan view and an elevation of the actual serving translator mechanism. A serving translator mechanism consists of a square tube 27 extending diagonally from the back corner of the freezer compartment 11 to pass by the circular ice cream extrusion 18 in the bottom of one of the bulk ice cream storage tanks 13 and the sleeve and collar 59 and hence to the opening through the freezer door leading to the ice cream cone delivery alcove 178. Mounted on this tube 27 is a square sliding collar and serving fork assembly 29. The serving fork has a square tube arm 79 which carries a semi-circular open end 80 of the same inside diameter as the extruded ice cream serving outside diameter. The sliding collar and fork assembly 29 is moved along the square tube 27 by an electric gear motor 26 turning a drum, cable and pulley assembly 28. Assembly 28 is a cable drive consisting of a cable drum 81 driven by gear motor 26, a pulley 82 mounted by bolt 83 to the front end of tube 27, and a cable 84 which winds around the drum 81 at the rear end of tube 27 and extends in a continuous loop around the pulley 82. One side of the cable loop passes through a hole in a rod 85 extending from the side of the square collar of the translator fork and is secured to this rod 85 by a set screw 86. Gear motor 26 is turned on by its switch 166 (FIG. 20A) at the end of the cut-off mechanism stroke. As is indicated in FIGS. 18 and 19, as the serving translator fork 29 moves forward it engages the cut off ice cream serving, which will adhere to the cold contact surface of fork 29 and translates it through the opening in the freezer door to the waiting cup-cone in the holder 87 in the delivery alcove 178. The square collar of the serving translator fork 29 is held snug against the bottom of tube 27 by a leaf spring 88 inside the top of the square collar. As the serving translator fork 29 reaches the front end of its travel it has positioned the ice cream serving over the top of the waiting cup-cone. When the square collar on the fork 29 hits stop 89 on its bottom front edge it causes the fork to dip down pushing the ice cream serving into the top of the cup-cone. This dip down of the fork 29 causes a square shaft 90 extending from inside the square tube arm of fork 29 to engage a lip 91 on the bottom edge of the serving alcove. The dip down of fork 29 also presses the off switch button 92 to the gear motor 26 whereupon fork 29 is returned to the rear of tube 27 by tension spring 30. As fork 29 starts to return shaft 90 which holds a curved plate 93 on its forward end inside of the serving fork semi-circle is caught on lip 91 which causes it to knock out the ice cream from the serving fork 29 and prevent it from being pulled back with the fork. Shaft 90 is raised up by its inclined travel disengaging it from lip 91. When the fork 29 reaches the rear end of its travel it actuates the relay latch release switch. This sends a pulse to the relay coil unlatching the relay and breaking the circuits to the hydraulic pump gear motor, the rectifier, and the selector buttons thus completing a vend cycle.

Referring to FIGS. 7, 8, 9, 14, 15, 16, and 17 according to the following description one may see the details of construction and operation of the cup-cone dispensing mechanism. The cup-cone dispenser includes a chain and sprocket assembly 31 in a horizontal plane at the base. There is a small sprocket 95 and a large sprocket 96 each mounted on a vertical shaft 97 under a floor plate 98. There are extension shafts 99 through the chain rollers of chain 100 which extend vertically through a slot 101 in floor plate 98. A plurality of cup stack holding cylinders 102 with holes in their bottoms to match the chain roller extension shafts 99, and tapered holes in their tops 103 to match the cup bottoms, are arranged at equal spaces over the side of the chain but supported by the floor plate 98. Shafts 99 extend up through floor plate 98 through slot 101 and into the holes in the bases of cylinders 102 providing a means for the chain and sprocket drive to slide the cylinders 102 around a desired path on the floor plate 98. There is a clock spring 104 on the shaft of sprocket 96 and a rachet stop lever 105 on sprocket shaft base 97. Lever 105 has a beveled strike which extends up through floor plate 98 to hold against cup-cone stack holder 102. It is held up by a compression spring 179. Cone stacks 106 are placed in the cone stack cylinders 102 one stack at a time and the chain sprocket assembly is turned back through the rachet lever 105 one stack holder at a time to wind the spring 104 as the stacks 106 are loaded. The spring then returns the cone stacks 106 to the using position as the previous stack is used. The cone stacks are free standing and support themselves except for a tube rail guide 107 around the top of the stack row. The using or dispensing position of the cup-cone stacks 106 is near the center of the cup dispenser case 43 on the front of the machine. Ahead of and above the top of the cone stack 106, in using position, is a vertical shaft 33. Held at the top of shaft 33 by spring 108 is a scissors support collar and arm 109 which supports scissors clamp arms 34 containing sponge rubber pads 35. To start with, the scissors clamp is above the top of the cone stack 106 in using position and the clamp is open. When the flavor in the tank served by this cone dispenser is chosen, by pushing the selector button, a switch is closed to energize the scissors clamp solenoid 110. Solenoid 110 actuates the scissors clamp lowering mechanism 111 of FIG. 16. As the solenoid 110 pulls on link 112, it moves offset link 113 to rotate on pin 114 which swings the link 113 arm down with roller 115 rolling on the ramp on arm 109 forcing the arm down shaft 33. As the scissors clamp 34 is lowered it mates with cam gate 116 which closes the clamp 34 around the rim of the top cone in the stack 106. The spring latch 117 slips into place over the edge of arm 34 by its spring 118 acting. The pads 35 prevent cone breakage. The scissors clamp solenoid 110 is de-energized by pushing its own off switch 119 and it returns by action of spring 120. The latched scissors clamp is now raised up by spring 108 under collar and arm 109 lifting the top cup in stack 106 above the stack. At the same time a piano wire hold down fork 121 holds down on the next cone in the stack to keep it from clinging to the lifted cone. Fork 121 is actuated by a tapered end on the scissors clamp swivel bolt 122 which extends down through a hole in the base of cam gate 116 when the clamp is lowered. As the scissors clamp 34 lifts the cone up, it trips a scissors clamp swing solenoid switch 123. The swing solenoid swings the scissors clamp arm sixty degrees by means of a pin 124 mating with a slot 125 in the scissors clamp arm and collar 109. Pin 124 is in an arm 126 which is rotated about a shaft 33 by links 127 attached to the swing solenoid 128. The sixty degree swing of clamp 34 places the raised cone over the top of the cone delivery tube 129. At this point a cam 130 releases the latch 117 and the clamp opens by means of springs 131 dropping the cone down tube 129 to light and be held in holder 87 in the ice cream cone delivery alcove. At this point also the scissors clamp swing solenoid 128 pushes its own off switch 132 and is de-energized. A spring 133 returns solenoid 128 swinging clamp 34 back sixty degrees to its beginning position. This return swing pushes the on switch 134 to the cone stack lift solenoid 135.

Figure 14:
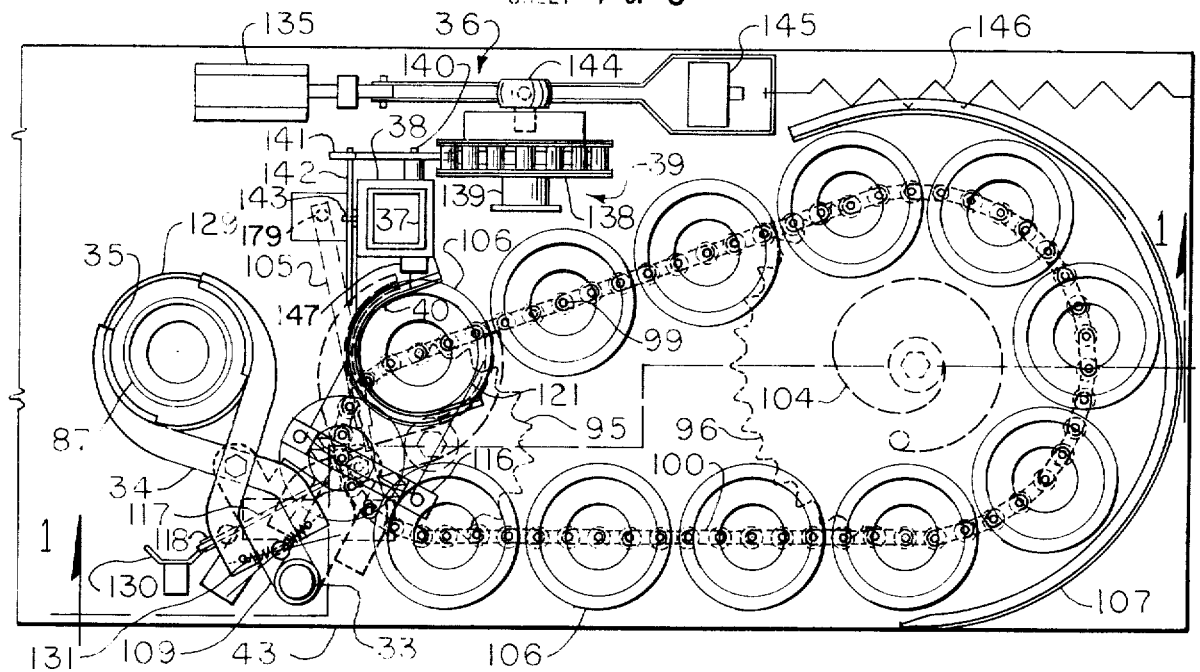
FIG. 14 is a plan view of the cup-cone dispensing mechanism for one tank.
Figure 15:
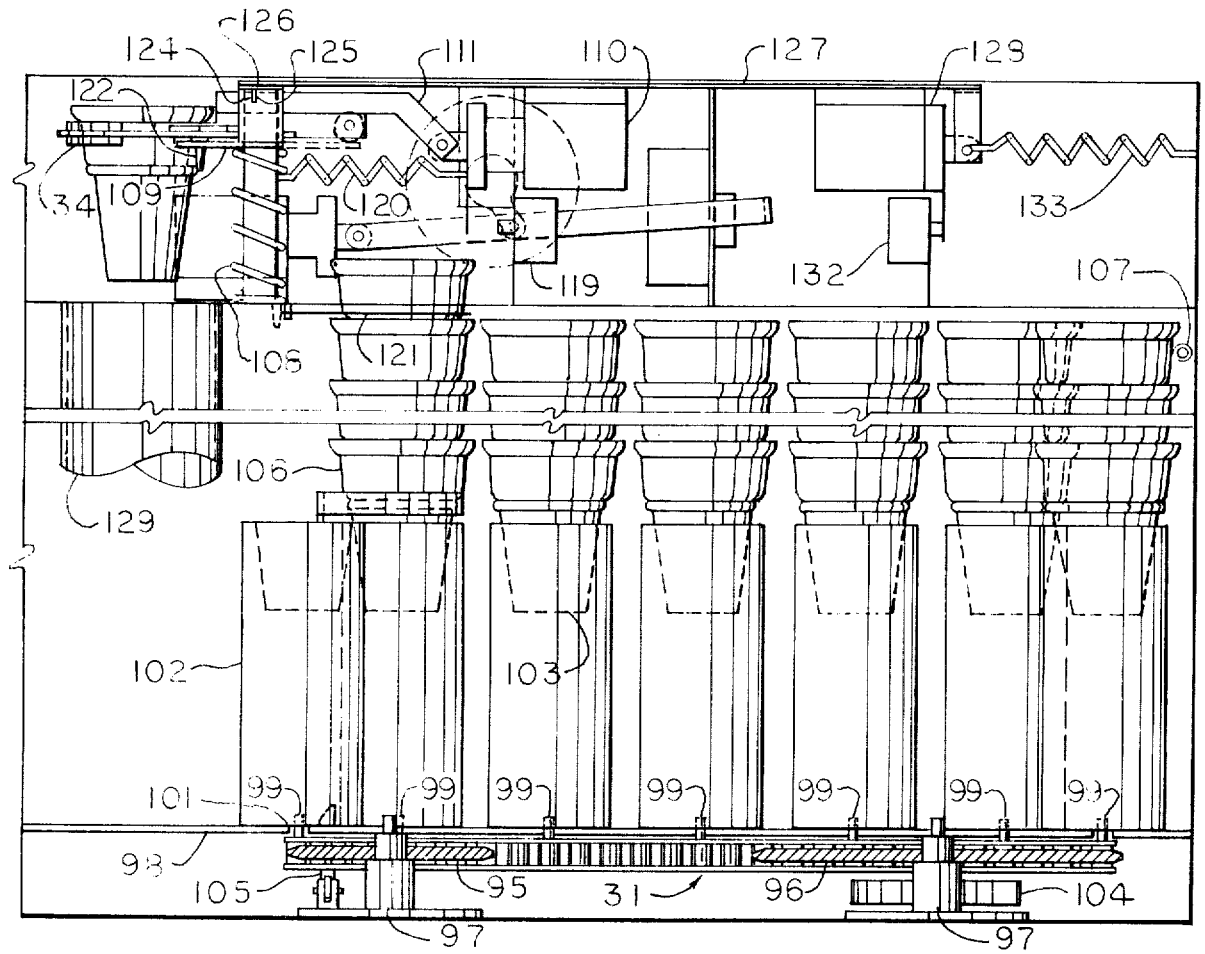
FIG. 15 is a sectional elevation of the cup-cone dispensing mechanism taken at section 1—1 on FIG. 14.
Figure 16:
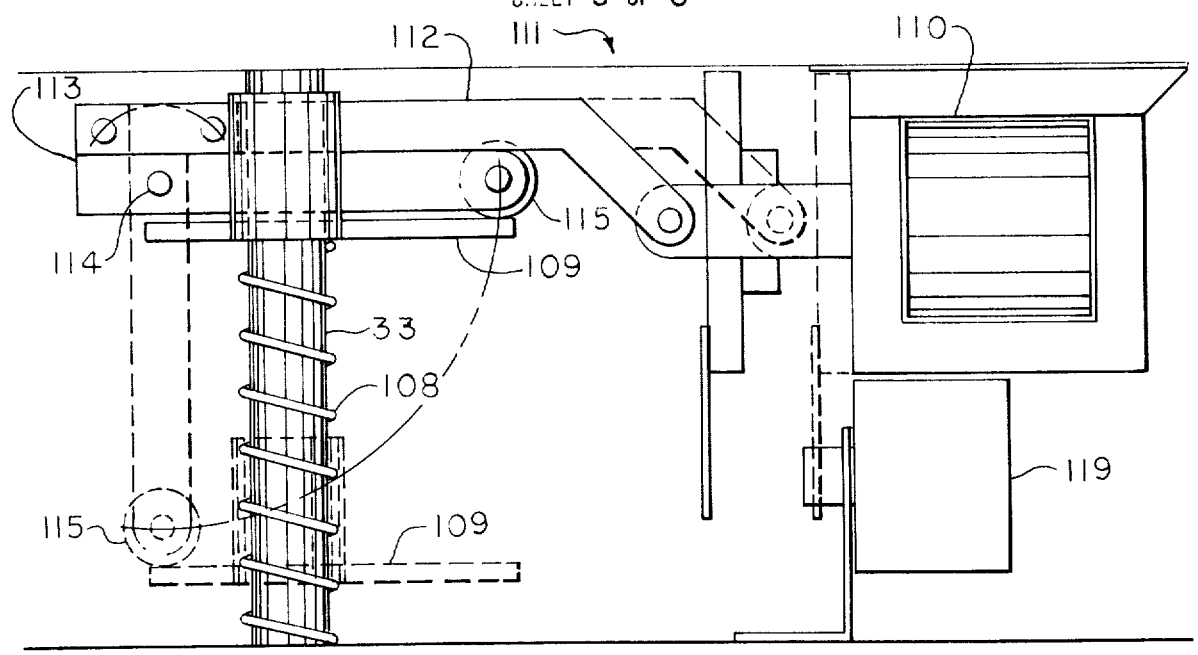
FIG. 16 is a larger scale elevation of the scissors clamp lowering mechanism in the cup-cone dispenser.
Figure 17:
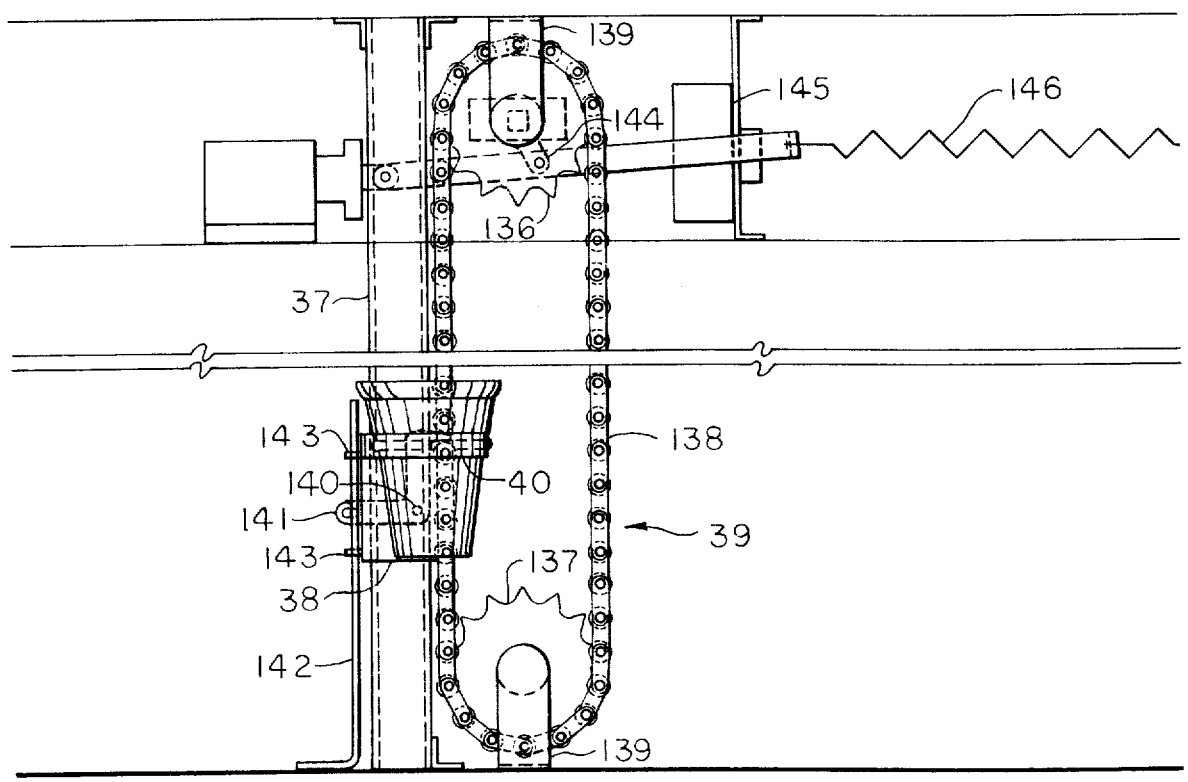
FIG. 17 is an elevation of the cup stack lifter mechanism of the cup-cone dispenser.

The cup-cone stack lifting mechanism 36 is in FIGS. 9 and 14 in plan view and in FIG. 17 in elevation. This mechanism consists of a chain and sprocket drive 39 with sprocket 136 at the top, sprocket 137 at the bottom, chain 138, mounting shafts and brackets 139; a square tube 37 on which is mounted a square collar slider and lifter fork 38 with sponge rubber liners 40 in the fork. The slider and lifter fork 38 is held at the proper angle and position to fit around and under the rim of the bottom cup in stack 106. A cup-cone stack is pushed into fork 38 by the cup stack holder drive previously described. The cup stack lift fork 38 is lined with sponge rubber to prevent breakage of the cake cup-cone. Mounted on a pin 140 on the side of cup stack slider and lifter fork 38 is a chain lift dog 141 arranged to engage chain 138 in a space between rollers. Also on slider and lifter fork 38 at right angles to lift dog 141 is a lift dog release lever 142. Lever 142 is slotted at two places to allow it to slide up and down on pins 143. A pin end of lever 142 engages a slot in lift dog 141 so that when lever 142 is pushed down it releases lift dog 141 from chain 138. Thus, as the cup stack is lifted up one cup-protrusion-height at a time by the lift fork 38 it reaches the point where the bottom or last cup in the stack is at the dispensing position. At this point the chain lift dog release lever is held down by the cabinet 43 shelf releasing the dog 141 from chain 138. The slider fork 38 slides all the way down tube 37. As it reaches the bottom a foot on lever 142 pushes down on rachet lever 105 releasing the cup stack holder drive to push the next cup stack into fork 38. The lever 142 is also pushed up causing dog 141 to engage the chain 138 ready for stack raising. The sprocket 136 at the top has a fitting into which is fitted a rachet arm 144. Rachet arm 144 is linked to stack lift solenoid 135 in the proper ratio to turn the sprocket and raise the cup stack one cup-protrusion-height each time cup stack lift solenoid 135 is energized. The solenoid 135 actuates its own off switch 145 and returns by spring 146 action. As the last cup in the last stack is lifted up a micro switch 147 (FIG. 14) is released to the on position to turn on the sold out light for the flavor button served by this cup dispenser.

Figure 20A:
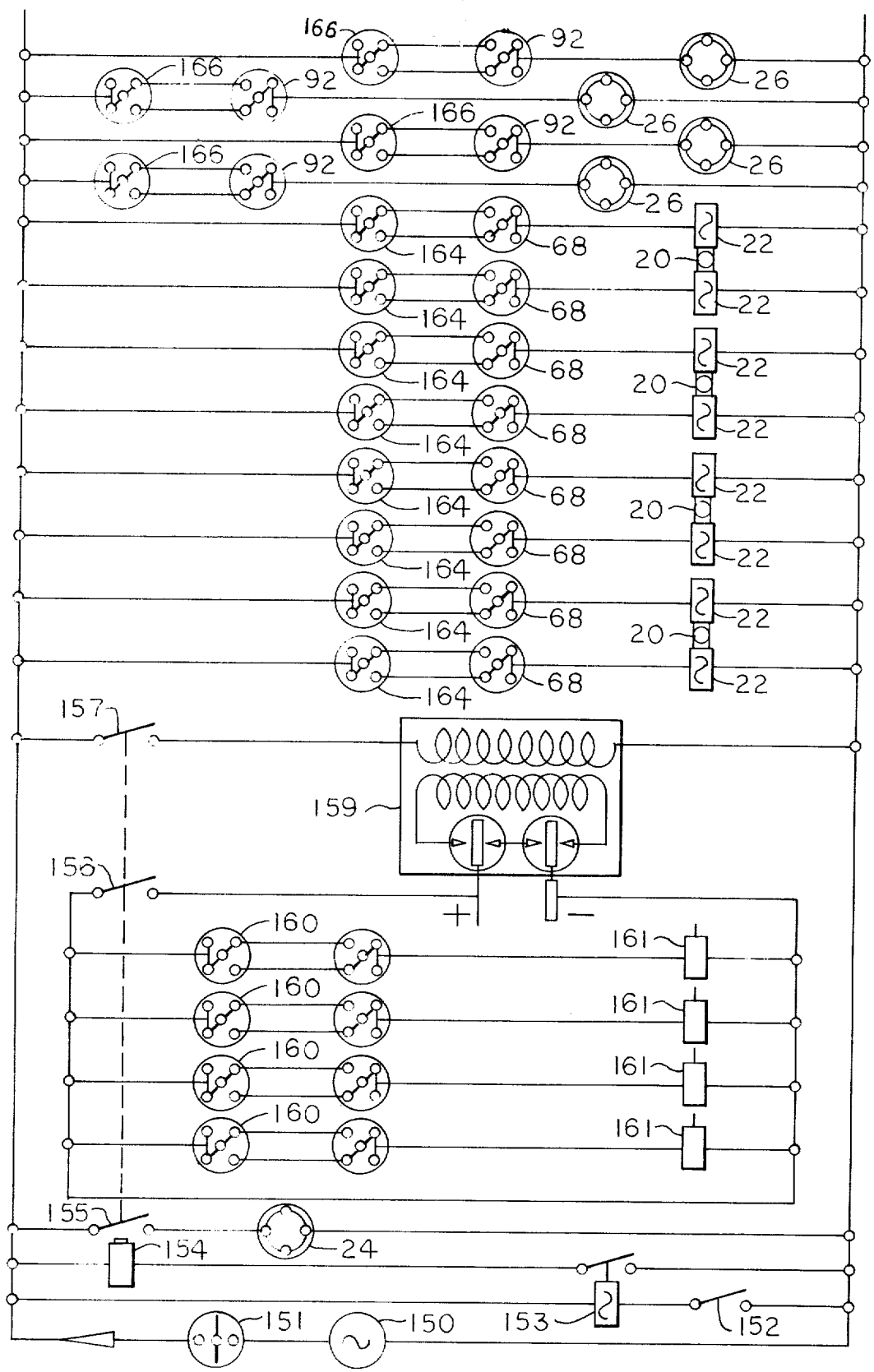
Figure 20B:
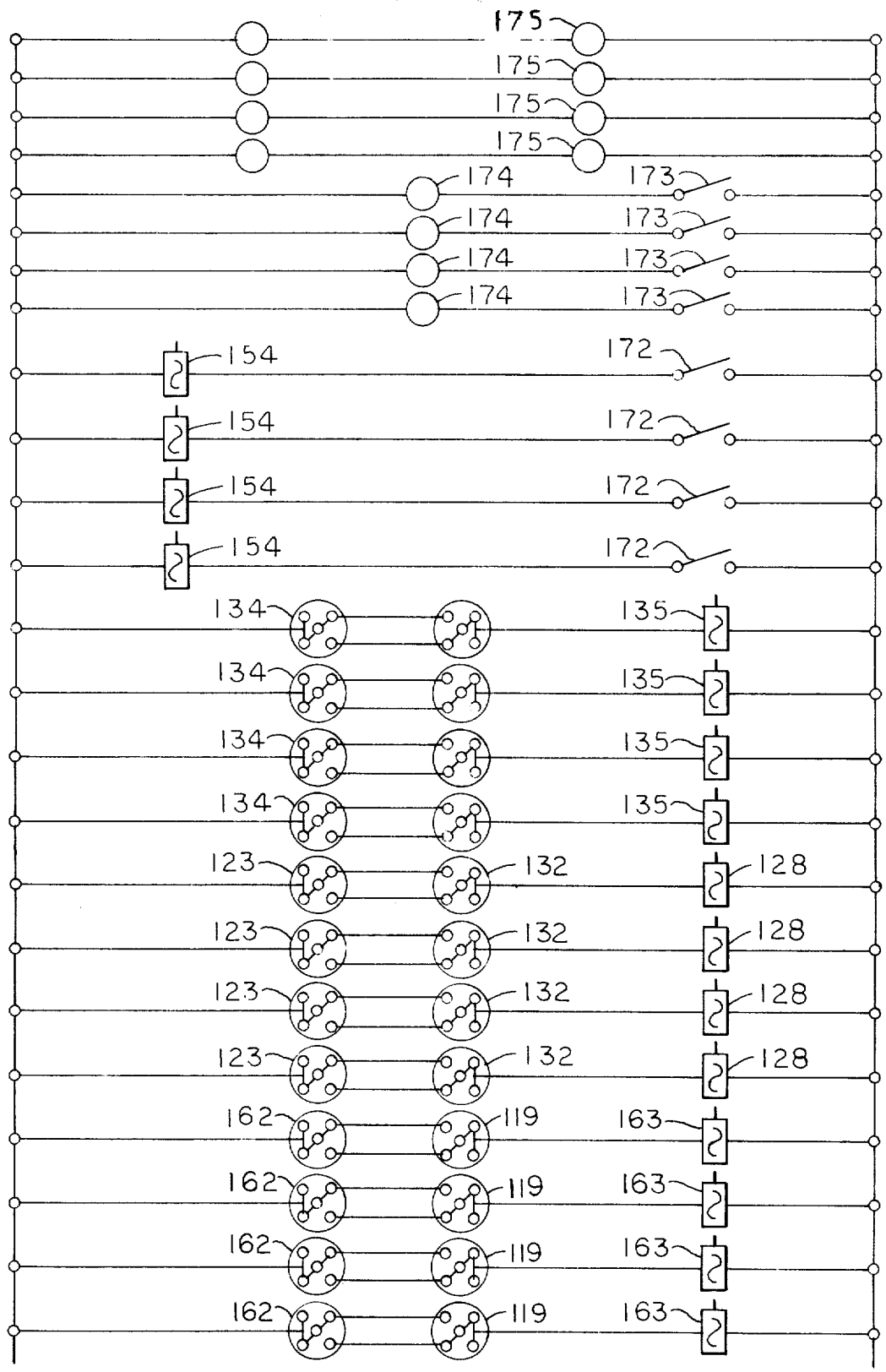

Looking at FIGS. 20A and 20B one will see a schematic wiring diagram for the vending machine of FIG. 1. The machine is connected to the 115 volt 60 cycle AC power supply 150 by a locking plug to prevent inadvertent unplugging. It is turned on by the master switch 151. The proper coins in the coin mechanism (not shown) actuate the vend switch 152 and the vend solenoid 153. This sends a current pulse to the latching relay 154 which connects poles 155, 156, and 157, closing the circuits to the hydraulic pump motor 24, the 110 volt to 12 volt rectifier 159 and the 12 volt line to the four pairs of three way switches 160 controlling the selector valve solenoids 161. Any one of four flavor selector buttons 176 (FIG. 1) will actuate one of the three way switches 160 to energize its corresponding selector valve solenoid 161 and also one of the four pairs of cup lift solenoid switches 162 which energizes its corresponding cup lift solenoid 163. Energizing the solenoid 161 moves the selector valve in the corresponding hydraulic line to direct hydraulic fluid into the chamber 17 of FIG. 2 in the top of the ice cream tank 13 extruding a column of ice cream out of hole 18 as previously described. When the ice cream column extends down a predetermined distance it actuates one each of the switches in two pairs of the eight pairs of three way switches 164 which control the four pairs of cut-off solenoids 22. The selected pair of solenoids actuates the twin piano wire cut-off loops 20 to sever an ice cream serving. At the end of cut-off, one switch of one of the four pairs of translator motor switches 166 is actuated to turn on the corresponding translator motor 26. The translator fork 29 proceeds to pick up the ice cream serving and deliver it to the cup in the delivery alcove. The ice cream column also actuates the companion three way switch 160 to the selector valve solenoid 161 de-energizing it and diverting the hydraulic flow from the tank 13 to the reservoir 41. The cut-off solenoids 22 actuate their companion three way switches 68 de-energizing them to return by springs. The translator forks 29 activate their companion three way switches 92 as the ice cream serving is placed in the cup turning off motors 26. The translator forks 29 return by action of springs 30. The cup lift solenoid 162 actuates a companion three way switch 119, de-energizes and returns by spring action where it actuates the swing solenoid switch 123, one switch in four pairs of three way switches controlling the swing solenoids 128. The energized solenoid 128 actuates its companion switch 132 at the end of swing, de-energizes and returns by spring. On the return swing scissors clamp 34 actuates a switch 134 in one of the four pairs of stack lift switches 134 energizing one of the four stack lift solenoids 135. As the stack lifts the companion three way switch is actuated to de-energize the solenoid 135 which returns by spring. The translator fork 29 at the end of its return stroke actuates the relay latch release switch 172. This sends a pulse to the relay 154 unlatching the relay and breaking the circuits to the pump motor 24, the rectifier 159, and the selector valve switches 160. As the last cup in the last stack of each of the four cup-cone dispensers is used it actuates a switch 173 to the sold out light 174 in the selector button. The display lights 175 light up each flavor button sign and the display sign 177 in case 42 (FIG. 1) showing colored photos of the ice cream cup-cones containing the different flavors of ice cream. Lights 175 are turned on and off by the master switch 151.

It shall be recognized that apparatus 10 may be adapted for the use of water at city pressure to operate the hydraulic system, eliminating the hydraulic pump 23, the gear motor 24 and the reservoir 41. In this water operated arrangement, the apparatus would include a pressure regulator and solenoid operated water valve, an antifreeze metering device to prevent freezing of the water in the tanks and any selections of the systems provided in apparatus 10.

The present invention may be adapted in place of the hand scooping of ice cream and when set up for this purpose, there will be multiple tanks, one or more of each flavor arranged in rows in frost free freezers at suitable heights for delivering the automatically dispensed servings. The individual servings dispensed could be used for cones, sundaes, milk shakes, malted milks, pie ala-mode and the like, thus eliminating the task of hand dipping.

What I now claim is:

1. Apparatus for dispensing individual solid servings of a frozen confection such as hard ice cream comprising:

a temperature controlled deep freeze housing; a tank located within said housing for storing said frozen confection, said tank having at one end thereof a removable dome, and at the opposite end an opening through the end wall of said tank; extrusion means for selectively applying a force to act upon said frozen confection within said tank to extrude a predetermined quantity through said opening; a serving cut-off mechanism for automatically cutting through the extruded confection when said predetermined quantity has been extruded through said opening, thereby isolating a serving of said confection; a serving delivery alcove located near the outside of said housing; a cup-cone dispensing mechanism for delivering a cupcone from a remote location to said delivery alcove; a translator mechanism for receiving said serving after it has been isolated by said cut off mechanism and for translating it to said delivery alcove in a position just above the cup-cone delivered by said dispensing mechanism, said translator mechanism further including a serving translator fork means for causing said serving to be dipped down into said cup-cone and for causing said serving to be separated from said translator mechanism.

2. The apparatus of claim 1 wherein said extrusion means comprises a movable sealing means located within said tank between said frozen confection and the dome end of said tank to thereby form a chamber between the said dome end and said sealing means for receiving hydraulic fluid, a hydraulic pump, an electric motor to drive said pump, a reservoir of hydraulic fluid, a hydraulic line in communication with said chamber and valve means for controlling the flow of fluid in said hydraulic line; wherein said extrusion means may be selectively activated to pump hydraulic fluid into said chamber for displacing said sealing means to thereby extrude a serving of frozen confection through said opening in said tank.

3. The apparatus of claim 2 wherein said sealing means comprises a diaphragm attached to the walls of said tank, said diaphragm being stretchable to increase the size of said chamber when acted upon by pressure from said hydraulic fluid to thereby act upon said frozen confection to extrude a portion of it out of said tank through said opening.

4. The apparatus of claim 1 wherein said serving cut off mechanism comprises a wire loop which is operably connected to an electrical solenoid, and upon actuation of said solenoid, said wire loop is caused to pass through said frozen confection to thereby sever a predetermined quantity to be used as a serving of said frozen confection.

5. The apparatus of claim 4 wherein said serving cut off mechanism is located below said opening in said tank and comprises two wire loops which overlap each other and encircle an area below said opening and each of said wire loops is fixedly secured by means of levers to an electrically actuated solenoid such that the wire loops when moved by the solenoids pass through the extruded confection in opposite directions to completely sever a serving of said confection.

6. The apparatus of claim 1 wherein said cup-cone dispensing mechanism includes a plurality of cup-cone stack holding cylinders, each connected to a chain and sprocket means for selectively positioning an appropriate one of said cylinders for removal therefrom of a stack of cup-cones for movement to a position wherein the top one of said cup-cones is picked up by a solenoid operated scissors clamp which grips said cup-cone and automatically moves it to a position centered over a delivery tube located above said alcove wherein said clamp will automatically release said cup-cone into said delivery tube for gravity travel to said delivery alcove.

7. Apparatus for dispensing solid servings of a frozen confection such as hard ice cream comprising: a temperature controlled deep freeze housing; a tank located within said housing for storing said frozen confection, said tank having at one end thereof a removable dome, and at the opposite end an opening through the end wall of said tank; extrusion means for selectively applying a force to act upon said frozen confection within said tank to extrude a predetermined quantity through said opening, said extrusion means comprising a stretchable sealing means located within said tank between said frozen confection and the dome end of said tank to thereby form a chamber between said dome end and said sealing means for receiving hydraulic fluid, a hydraulic pump, an electric motor to drive said pump, a reservoir of hydraulic fluid, a hydraulic line in communication with said reservoir and said chamber, valve means interposed in said hydraulic line for controlling the flow of fluid therein, and a serving cut-off mechanism; wherein said extrusion means may be selectively activated to pump hydraulic fluid into said chamber for displacing said sealing means to thereby extrude a serving of frozen confection through said opening in said tank, and wherein said serving cut-off mechanism is automatically actuated when said predetermined quantity of said confection has been extruded.

* * * * *